United States Patent
Takahashi et al.

(12) 
(10) Patent No.: US 6,759,442 B2
(45) Date of Patent: Jul. 6, 2004

(54) PACKING MATERIAL FOR SOLID PHASE EXTRACTION AND SOLID PHASE EXTRACTION METHOD

(75) Inventors: Ryuji Takahashi, Kanagawa (JP); Hiroshi Suzuki, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 66 days.

(21) Appl. No.: 09/871,723

(22) Filed: Jun. 4, 2001

(65) Prior Publication Data

US 2002/0004561 A1 Jan. 10, 2002

Related U.S. Application Data

(60) Provisional application No. 60/279,108, filed on Mar. 28, 2001.

(30) Foreign Application Priority Data

Jun. 2, 2000 (JP) .................................... P2000-165473

(51) Int. Cl.$^7$ ........................... C08F 12/34; B01D 15/08
(52) U.S. Cl. .............................. 521/32; 521/33; 521/34; 525/326.9; 525/330.3; 525/330.4; 525/330.5; 525/359.2
(58) Field of Search .............................. 521/32, 33, 34; 525/329.9, 359.2, 330.3, 330.4, 330.5

(56) References Cited

U.S. PATENT DOCUMENTS

| | | | | |
|---|---|---|---|---|
| 2,591,573 A | * | 4/1952 | McBurney .................... | 521/32 |
| 3,991,018 A | * | 11/1976 | Strop et al. .................... | 521/32 |
| 4,031,037 A | * | 6/1977 | Kalal et al. .................... | 521/34 |
| 4,058,491 A | * | 11/1977 | Steckler ........................ | 521/38 |
| 4,067,825 A | * | 1/1978 | Hradil et al. .................. | 521/32 |
| 4,101,461 A | * | 7/1978 | Strop et al. .................... | 521/32 |
| 4,311,799 A | * | 1/1982 | Miyake et al. ................. | 521/31 |
| 6,303,702 B1 | * | 10/2001 | Davankov et al. ........ | 525/332.2 |
| 6,322,695 B1 | * | 11/2001 | Lee et al. ................. | 210/198.2 |

FOREIGN PATENT DOCUMENTS

| | | | | | |
|---|---|---|---|---|---|
| JP | 01056149 A | * | 3/1989 | ............ | B01J/41/14 |
| JP | 03131610 A | * | 6/1991 | ........... | C08F/20/22 |

OTHER PUBLICATIONS

Orr, "Size Measurement of Particles", Kirk–Othmer Encyl. of Chem. Tech., 3$^{rd}$ ed., vol. 21, John Wiley Sons, New York, pp 106–131 (1983).*

* cited by examiner

Primary Examiner—Bernard Lipman
(74) Attorney, Agent, or Firm—Sughrue Mion, PLLC

(57) ABSTRACT

An object of the present invention is to provide a packing material for solid phase extraction, ensuring excellent recovery of not only a hydrophobic substance but also an ionic substance by having hydrophobicity and an ion exchange group at the same time, and a solid phase extraction method, a packing apparatus, and a method for treating a sample, using the packing apparatus. A packing material for solid phase extraction of the present invention is a particle obtained by copolymerizing a hydrophobic monomer (A) and a hydrophilic monomer (B) and introducing thereinto an ion exchange group, in which the ion exchange group is introduced without impairing the hydrophobic site. The present invention also provides a solid phase extraction method, a packing apparatus for solid phase extraction and a method for treating a sample, using the packing material.

19 Claims, No Drawings

PACKING MATERIAL FOR SOLID PHASE EXTRACTION AND SOLID PHASE EXTRACTION METHOD

CROSS REFERENCE TO RELATED APPLICATIONS

This application is an application filed under 35 U.S.C. §111(a) claiming benefit pursuant to 35 U.S.C. §119(e)(1) of the filing date of Provisional application Ser. No. 60/279,108 filed Mar. 28, 2001 pursuant to 35 U.S.C. §111(b).

FIELD OF THE INVENTION

The present invention relates to a packing material for solid phase extraction, having a hydrophobic group and an ion exchange group within a particle, and also relates to a solid phase extraction method, a packing apparatus and a method for treating a sample, using the packing material.

BACKGROUND OF THE INVENTION

A liquid-liquid extraction method has been heretofore used for extracting a sample from a liquid in many cases, however, this method has a problem in that the operation is cumbersome, a large amount of a solvent is used and the solvent used greatly affects the environment and the human body. At present, with the progress of synthesis methods, a solid phase extraction method using silica-based or synthetic polymer-based porous particles is used, where the operation is simple, the amount of solvent used is small and a large amount of sample can be automatically treated.

The packing material for use in the solid phase extraction includes those using an inorganic substrate, such as chemical bond-type silica gel where the surface of silica gel is subjected to a chemical modification with an octadecyl group to render the surface of the packing material hydrophobic, and those using an organic substrate, such as synthetic polymer represented by styrene-divinylbenzene. These packing materials utilize a hydrophobic interaction between the hydrophobic group of the packing material and the hydrophobic group of a sample, and therefore, are not suitable for the pretreatment operation of an ionic substance.

Accordingly, an ion exchange resin has been used for the operation of pretreating an ionic substance by solid phase extraction, however, since the ion exchange resin is obtained by introducing an ion exchange group into the surface of silica gel or a hydrophilic synthetic polymer or by introducing an ion exchange group into a hydrophobic substrate resin to change the property thereof to be extremely hydrophilic, the interaction between the packing material and a sample is only an ion exchange activity.

As such, in the case of conventional packing materials for solid phase extraction, the hydrophobic interaction or ion exchange activity of the packing material particle is used independently and studies have not been satisfactorily made on a packing material particle for solid phase extraction having different properties at the same time.

SUMMARY OF THE INVENTION

An object of the present invention is to obtain a packing material having excellent capabilities by studying conventional packing materials for solid phase extraction each having a property of bringing about a hydrophobic interaction or ion exchange activity independently, and a packing material having a hydrophobic site and an ion exchange site at the same time within a particle.

As a result of continuous and extensive investigations to overcome the above-described problems, the present inventors found that a packing material for solid phase extraction ensuring excellent recovery of samples including a hydrophobic substance and an ion exchange substance can be obtained by introducing an ion exchange site while not impairing the hydrophobic site within a particle, thereby having both properties. The present invention has been accomplished based on this finding.

More specifically, the present invention relates to the following embodiments.

[1] A packing material for solid phase extraction, comprising a synthetic polymer obtained by copolymerizing a hydrophobic monomer (A) and a hydrophilic monomer (B) and introducing thereinto an ion exchange group by a chemical modification.

[2] The packing material for solid phase extraction as described in [1] above, which contains an aromatic divinyl compound as the hydrophobic monomer (A) in an amount of 30% by mass or more based on the total amount of monomers.

[3] The packing material for solid phase extraction as described in [1] or [2] above, which contains an N-vinylcarboxylic acid amide as the hydrophilic monomer (B) in an amount of 5 to 60% by mass based on the total amount of monomers.

[4] The packing material for solid phase extraction as described in [3] above, wherein the N-vinylcarboxylic acid amide is N-vinyl-2-pyrrolidone or N-vinylacetamide.

[5] The packing material for solid phase extraction as described in any one of [1] to [4] above, which contains a (meth)acrylic acid ester of a polyhydric alcohol having a hydroxyl group as the hydrophilic monomer (B) in an amount of 10% by mass or more based on the total amount of monomers.

[6] The packing material for solid phase extraction as described in [5] above, wherein the (meth)acrylic acid ester of a polyhydric alcohol having a hydroxyl group is glycerol dimethacrylate.

[7] The packing material for solid phase extraction as described in any one of [1] to [6] above, wherein the ion exchange group is introduced by covalent bonding.

[8] The packing material for solid phase extraction as described in any one of [1] to [7] above, wherein the ion exchange group covalently bonded is a sulfo group or a quaternary ammonium.

[9] The packing material for solid phase extraction as described in any one of [1] to [8] above, wherein the amount of the ion-exchange group covalently bonded is 5$\mu$-equivalent or more based on 1 dry gram of the packing material.

[10] The packing material for solid phase extraction as described in any one of [1] to [9] above, which is used by packing it in a packing apparatus.

[11] The packing material for solid phase extraction as described in [10] above, wherein the packing apparatus is a column, a cartridge or a reservoir.

[12] The packing material for solid phase extraction as described in any one of [1] to [11] above, which is used for concentrating an objective component and/or removing impurities or contaminants.

[13] The packing material for solid phase extraction as described in any one of [1] to [12] above, which has an average particle size of 1 to 200 $\mu$m.

[14] A method comprising using the packing material for solid phase extraction described in any one of [1] to

[13] above in solid phase extraction employing a column switching method.

[15] A column for solid phase extraction, which is packed with the packing material for solid phase extraction described in any one of [1] to [13] above.

[16] A cartridge for solid phase extraction, which is packed with the packing material for solid phase extraction described in any one of [1] to [13] above.

[17] The column for solid phase extraction as described in [15] above, which is used for concentrating an objective component and/or removing impurities or contaminants.

[18] The cartridge for solid phase extraction as described in [16] above, which is used for concentrating an objective component and/or removing impurities or contaminants.

[19] A solid phase extraction method for an environment-related, medical or biological sample, which uses the column for solid phase extraction described in [15] or [17] above.

[20] A solid phase extraction method for an environment-related, medical or biological sample, which uses the cartridge for solid phase extraction described in [16] or [18] above.

[21] The method as described in [19] above, which is performed for the purpose of identification or quantification of a drug sample in serum.

[22] The method as described in [20] above, which is performed for the purpose of identification or quantification of a drug sample in serum.

DESCRIPTION OF THE PRESENT INVENTION

A mode for carrying out the present invention is described in detail below, however, the present invention is not limited thereto.

The packing material for solid phase extraction of the present invention is a particle having a hydrophobic group and an ion exchange group at the same time. This particle is not limited to an inorganic or organic substrate, but in view of easiness in bulk synthesis, exertion of hydrophobic property, introduction of an ion exchange group and the like, a synthetic polymer-based packing material for solid phase extraction using an organic substrate is preferred. Examples thereof include polystyrene-divinylbenzene polymers; poly(meth)acrylate polymers, such as polyacrylate, glycidyl methacrylate and glycerol dimethacrylate; and various copolymers thereof.

The packing material for solid phase extraction of the present invention is a particle obtained by polymerizing monomers containing at least a hydrophobic monomer (A) and introducing thereinto an ion exchange group, preferably a particle obtained by copolymerizing a hydrophobic monomer (A) and a hydrophilic monomer (B) and covalently bonding an ion exchange group to the hydrophilic monomer site while not impairing the hydrophobic property.

The hydrophobic monomer (A) for use in the present invention is not particularly limited as long as it polymerizes with a monomer used. Examples thereof include aromatic compounds having a vinyl group, such as styrene, methylstyrene, chloromethylstyrene and butoxystyrene; aromatic compounds having two or more vinyl groups, such as divinylbenzene, divinyltoluene, divinylxylene and divinylnaphthalene; and polyhydric alcohol poly(meth)acrylic acid esters, such as ethylene glycol di(meth)acrylate, polyethylene glycol di(meth)acrylate, propylene glycol di(meth)acrylate, polypropylene glycol di(meth)acrylate, tetramethylolmethane tri(meth)acrylate and tetramethylolmethane tetra(meth)acrylate.

The hydrophobic monomer (A) for use in the present invention is preferably a compound having two or more vinyl groups in view of the swelling degree of the produced particle, more preferably an aromatic divinyl compound having two or more vinyl groups in view of hydrophobicity. Among these aromatic compounds having two or more vinyl groups, divinylbenzene is preferred because of its easy availability. Taking into account the swelling degree and hydrophobicity of the produced particle, the divinyl compound is preferably contained in an amount of 30% by mass or more, more preferably 45% by mass or more, based on the total amount of monomers. If the amount of the aromatic divinyl compound is less than 30% by mass, the hydrophobic property is disadvantageously impaired.

The purity of the aromatic compound having two or more vinyl groups for use in the present invention, such as divinylbenzene, is not particularly limited, however, the aromatic compound preferably has a purity of 55% by mass or more.

The packing material for solid phase extraction of the present invention is a particle obtained by polymerizing monomers containing at least a hydrophobic monomer (A) and introducing thereinto an ion exchange group and for improving the accessibility of an ionic substance to the surface of the packing material to perform the ion exchange activity more smoothly. Hydrophilicity is preferably imparted by copolymerizing a hydrophobic monomer (A) and a hydrophilic monomer (B).

The hydrophilic monomer (B) for use in the present invention is not particularly limited as long as it is a copolymerizable monomer having a polar group and capable of imparting hydrophilicity, but examples thereof include N-vinylcarboxylic acid amides such as N-vinylformamide, N-vinylacetamide, N-vinylpropionamide, N-(propenyl-2-yl)formamide, N-(propenyl-2-yl)acetamide and N-vinyl-2-pyrrolidone. Among these, in view of hydrophilicity and operability of the reaction, N-vinylacetamide and N-vinyl-2-pyrrolidone are preferred.

The N-vinylacetamide or N-vinyl-2-pyrrolidone is used preferably in an amount of 5 to 60% by mass, more preferably from 5 to 30% by mass, based on the total amount of monomers. If the amount of the N-vinyl acetamide or N-vinyl-2-pyrrolidone is less than 5% by mass based on the total amount of monomers, the hydrophilic property cannot be brought out and this is not preferred, whereas if it exceeds 60% by mass, the ratio of the crosslinkable monomer decreases and the swelling degree disadvantageously increases.

The packing material for solid phase extraction of the present invention is obtained by introducing an ion exchange group into the hydrophilic monomer site while not impairing the hydrophobic property and for introducing the ion exchange group, a (meth)acrylic acid ester of a polyhydric alcohol having a hydroxyl group is further used as the hydrophilic monomer (B). Examples of the (meth)acrylic acid ester of a polyhydric alcohol having a hydroxyl group include 2-hydroxyethyl (meth)acrylate, 2-hydroxypropyl (meth)acrylate, pentaerythritol di(meth)acrylate, pentaerythritol tri(meth)acrylate, glycerol mono(meth)acrylate and glycerol di(meth)acrylate. Among these, glycerol di(meth)acrylate is preferred in view of reactivity, operability during the reaction and swelling degree of the produced copolymer particle.

The (meth)acrylic acid ester of a polyhydric alcohol having a hydroxyl group is preferably contained in an amount of 10% by mass or more, more preferably from 20 to 25% by mass, based on the total amount of monomers. If the amount of the (meth)acrylic acid ester of a polyhydric alcohol having a hydroxyl group is less than 10% by mass, the ratio of the hydroxyl group for the covalent bonding of an ion exchange group becomes small and the ion exchange group cannot be introduced in a sufficiently large amount.

The packing material for solid phase extraction of the present invention is porous and for the purpose of imparting the porosity, a diluent is added to the mixture of monomers at the polymerization. The diluent which can be used is an organic solvent having properties so that it dissolves in the monomer mixture, is inactive to the polymerization reaction and does not dissolve the polymer produced.

Examples thereof include aromatic hydrocarbons, such as toluene, xylene, ethylbenzene and diethylbenzene; saturated hydrocarbons, such as hexane, heptane, octane and decane; alcohols, such as isoamyl alcohol, hexyl alcohol, octyl alcohol and 2-ethylhexyl alcohol; aliphatic halogenated hydrocarbons, such as dichloromethane, dichloroethane and trichloroethane; aliphatic or aromatic esters, such as ethyl acetate, butyl acetate, dimethyl phthalate and diethyl phthalate; and glycerol triesters, such as triacetin, tributyrin and tricaprin. These organic solvents used as a diluent can be used individually or in combination of two or more thereof.

The amount of the diluent added is preferably from 10 to 300% by mass based on the total amount of the hydrophobic monomer (A) and the hydrophilic monomer (B).

The copolymer particle of the present invention is produced by suspension polymerization in an aqueous medium containing an appropriate dispersion stabilizer. In this case, the polymerization initiator used is not particularly limited as long as it is a known radical polymerization initiator capable of generating a radical, and examples thereof include azo-type initiators, such as 2,2'-azobisisobutyronitrile and 2,2'-azobis(2,4-dimethylvaleronitrile). The concentration of the polymerization initiator is preferably from 0.1 to 5% by mass based on the monomers.

In the present invention, the polymerization reaction may be performed by a suspension polymerization method of stirring, thereby suspending a monomer solvent containing a diluent in an aqueous medium containing an appropriate dispersion stabilizer and then allowing the polymerization to proceed. The dispersion stabilizer may be a known dispersion stabilizer and in general, a water-soluble polymer compound, such as gelatin, sodium polyacrylate, poly(vinyl alcohol), hydroxyethyl cellulose and carboxymethyl cellulose is used. The concentration of the dispersion stabilizer is preferably from 0.1 to 5% by mass based on the aqueous medium. The aqueous medium is a medium mainly comprising water, and in the medium, a salt and other water-soluble components may be dissolved in addition to water.

The polymerization reaction is preferably performed by dissolving a salt in the aqueous medium for the purpose of preventing the monomers from dissolving in the aqueous medium. Examples of the salts include sodium chloride, calcium chloride and sodium sulfate, which are commonly used.

The N-vinylcarboxylic acid amide has a high solubility in water, and therefore, a salt is preferably used in a high concentration to prevent the dissolution. The salt used and the concentration thereof are not particularly limited but, for example, sodium chloride is preferably used in an amount of 0.1 to 15% by mass and calcium chloride is preferably used in an amount of 1 to 40% by mass, based on the aqueous medium, because the solubility varies depending on the salt used.

With respect to the weight ratio (liquid ratio) of the aqueous dispersion medium phase containing a dispersion stabilizer and a salt to the organic solvent phase, formed by mixing a monomer mixture containing the hydrophobic monomer (A) and the hydrophilic monomer (B) with a diluent and dissolving a polymerization initiator therein, the liquid ratio of the aqueous dispersion phase to the organic solvent phase is preferably from 2:1 to 10:1. This is because the N-vinylcarboxylic acid amide is distributed into the aqueous dispersion medium phase due to its high solubility in water and the yield decreases. If the liquid ratio is too small, the suspension dispersion of the organic solvent phase becomes unstable.

The polymerization reaction is performed, after purging with nitrogen, by heating to 40 to 100° C. with ordinary stirring for 5 to 16 hours at an atmospheric pressure. The organic solvent layer is formed into spherical particles by stirring and the particles disperse in the aqueous medium, whereby the reaction proceeds. At this time, the particles each containing a diluent are polymerized, and the polymer grows as a network polymer so that when the diluent is removed later, porous particles can be obtained.

After the reaction, the particles can be easily separated by filtration or the like, and the diluent can be easily removed by washing with a solvent, such as acetone or methanol and then drying. The thus-obtained packing material for solid phase extraction is classified into a particle size of 1 to 200 $\mu$m, preferably from 1 to 100 $\mu$m, more preferably from 10 to 70 $\mu$m, and then used as a packing material into which an ion exchange group is introduced. If the particle size of the packing material for solid phase extraction is less than 1 $\mu$m, the particles disadvantageously pass through a filter or a frit for preventing the outflow of gel, whereas if the particle size exceeds 200 $\mu$m, the specific surface area per unit weight is reduced to decrease the absorption amount, which is not preferred.

The packing material for solid phase extraction of the present invention is a packing material for solid phase extraction having hydrophobicity and ion exchangeability at the same time, which is obtained by introducing an ion exchange group into the hydrophilic site produced from the hydrophilic monomer (B) without impairing the property of hydrophobic site produced from the hydrophobic monomer (A).

The ion exchange group subjected to chemical modification is not particularly limited, however, examples of the cation exchange group include a sulfo group and a carboxyl group. Among these, a sulfo group is preferred because this dissociates over a wide pH region to exert the ion exchange performance.

Examples of the anion exchange group include a quaternary ammonium group, a primary amino group, a secondary amino group, a tertiary amino group and a mixture of primary amino group and secondary amino group. Among these, a quaternary ammonium group is preferred because it dissociates over a wide pH region to exert the ion exchange performance.

The ion exchange group is introduced by chemically bonding it to a hydroxyl group introduced from a (meth) acrylic acid ester of a polyhydric alcohol having a hydroxyl group as the hydrophilic monomer (B). The chemical bonding method is not particularly limited and, for example, in the case of a direct reaction with a hydroxyl group, a method of reacting propanesultone to covalently bond a sulfo group or a method of directly reacting a compound having a quaternary ammonium group and an epoxy group, such as glycidyl trimethylammonium chloride, to covalently bond the quaternary ammonium group may be used.

The ion exchange group may also be covalently bonded by reacting epichlorohydrin or a compound having two glycidyl groups, such as 1,4-butanediol diglycidyl ether, ethylene glycol diglycidyl ether or glycerol diglycidyl ether, with a hydroxyl group to introduce an epoxy group and cause a reaction with the epoxy group.

For example, a method of reacting trimethyl amine, triethyl amine, tributyl amine or the like with a packing material having introduced thereinto an epoxy group to covalently bond a quaternary ammonium group or a method of reacting an inorganic salt, such as anhydrous sodium sulfite, to covalently bond a sulfo group may be used.

From the standpoint of safety and easy availability of a reagent, the covalent bonding of the ion exchange group is preferably performed after the introduction of an epoxy group. In the case of a quaternary ammonium group, the ion exchange amount is preferably $5\mu$ equivalent or more per 1 dry gram of the packing material and in the case of a sulfo group, the ion exchange is preferably $20\mu$ equivalent or more per 1 dry gram of the packing material. If the ion exchange amount is less than this preferred range, the ion exchange activity is disadvantageously not brought out.

The packing material for solid phase extraction of the present invention can be widely applied to the concentration of trace components or removal of impurities or contaminants, and can be used by packing it into a packing apparatus, for example, a reservoir of a column or a cartridge.

The solid phase extraction method uses the packing material which is used in solid phase extraction by packing it into a packing apparatus (a container called a reservoir of a column or a cartridge). The shape and construction material of the container as the packing apparatus such as column, cartridge and reservoir, are not particularly limited as long as the container is insoluble in the organic solvent used and impurities do not dissolve out from the container itself during the operation of solid phase extraction.

In the present invention, the cartridge means a cylindrical container having an internal diameter of 2 to 6 mm$\phi$ and a length of 10 to 30 mm with both ends being stopped by a frit or a filter to prevent outflow of the packing material, where the frit or filter is fastened by a cap having a hole of 0.1 to 1 mm$\phi$ in the center. The cartridge by itself has no connector necessary for flowing a liquid, and therefore, is used by fixing it to an exclusive reservoir container called a cartridge holder, a guard holder or a holder.

The column means a cylindrical container having an internal diameter of 2 to 6 mm$\phi$ and a length of from 10 to 50 mm with both ends being stopped by an end fitting, where the end fitting has a joint connector together with a frit or a filter for preventing the outflow of packing material, and therefore, the container can be directly connected to allow the flowing of a liquid.

Examples of the construction material for the cartridge or column include inorganic materials such as stainless steel and glass, and synthetic resin materials such as polyethylene, polypropylene and polyether ether ketone. Among these, in view of simplicity, convenience and cost, a polyethylene-made container is preferred and examples thereof include an injector-type container having a volume of 1 to 200 mL, preferably from 1 to 100 mL.

In the column or cartridge for solid phase extraction, a porous plate called filter or frit having a pore of 5 to 200 $\mu$m, preferably from 10 to 50 $\mu$m, is set at both ends of the column or cartridge to prevent the packing material from passing through during the operation of solid phase extraction. The construction material of the filter or frit is not particularly limited and examples thereof include stainless steel, glass, polyethylene and polytetrafluoroethylene. Among these, polyethylene is preferred in view of the cost and operability.

The amount of the packing material for solid phase extraction packed in the reservoir of a column or a cartridge varies depending on the bulk density of particles or the concentration of the sample, however, the amount packed is usually from 30 to 500 mg, preferably from 50 to 300 mg, based on the volume of 3 mL in each case.

The packing material for solid phase extraction of the present invention and the packing apparatus for solid phase extraction, such as column or cartridge for solid phase extraction, can also be applied to a sample pretreatment using a column switching method.

Various methods are known for the column switching method and examples thereof include a method where a column or cartridge for solid phase extraction is fixed in front of a column for analysis; impurities or contaminants present together are adsorbed by the column or cartridge for solid phase extraction to feed only necessary fractions to the column for analysis; and the column or cartridge for solid phase extraction used for the pretreatment is washed with another eluent by changing over the value while continuing the analysis. In another method, only necessary fractions are once adsorbed to the column or cartridge for solid phase extraction and after interfering components are flowed out, the valve is switched over to introduce the adsorbed components newly with another eluent into the column for analysis.

The use of the packing apparatus, such as column or cartridge, packed with the packing material for solid phase extraction of the present invention is not particularly limited, however, in view of the properties of the packing material for solid phase extraction, the packing apparatus can be used for concentrating a trace objective substance contained in an extra dilute solution and/or for easily removing impurities or contaminants present together in an analysis treatment of environment-related sample, a medical sample or the like. More specifically, the packing apparatus is suitably used for the measurement of harmful substances, such as agrochemicals in river water, the measurement of residual agrochemicals in farm products, the measurement of drugs in serum, and the like.

The method for treating an environment-related or medical sample of the present invention is a solid phase extraction method of extracting an objective component using the above-described packing material and/or the packing apparatus for solid phase extraction, such as column or cartridge, for solid phase extraction. The treatment method of the present invention is a treatment for concentrating a trace objective substance contained in an extra dilute solution and/or removing impurities or contaminants present together during analysis of various samples and can be applied as a pretreatment and/or a post-treatment in various analyses. The packing material and the column or cartridge for solid phase extraction of the present invention are suitably used in the measurement for the identification or quantification of a drug sample in serum.

EXAMPLES

The present invention is described in greater detail below by referring to the Examples, however, the present invention is by no means limited to these Examples. Unless indicated otherwise herein, all parts, percents, ratios and the like are by weight.

Example 1

Polymerization of Packing Material for Introduction of Ion Exchange Group 15.00 g of N-vinyl-2-pyrrolidone (produced by Wako Pure Chemical Industries, Ltd.) was dissolved in a mixed solution of a monomer phase containing 45.00 g of divinylbenzene having a purity of 81% (DVB-H, produced by Sankyo Kasei K. K.) and 15.00 g of glycerol dimethacrylate (NK Ester 1 G, produced by Shin Nakamura Kagaku Kogyo K. K.) and a diluent phase containing 30.28 g of toluene (produced by Wako Pure Chemical Industries, Ltd.) and 10.10 g of 2-ethylhexyl alcohol (produced by Wako Pure Chemical Industries, Ltd.). Subsequently, 2.00 g of 2,2'-azobis(2,4-dimethylvaleronitrile) was dissolved therein to prepare an oil layer.

In 286 mL of deionized water, 103.5 g of calcium chloride and 10.35 g of sodium chloride were dissolved to prepare a salt solution. Subsequently, 4 g of polyvinyl alcohol (Kuraray Poval PVA-224, produced by Kuraray K. K.) and 4 g of sodium chloride were dissolved in 100 mL of deionized water and therefrom, 86 mL was sampled and added to the salt solution. Furthermore, 6.4 mg of sodium nitrite was dissolved in 10 $\mu$L of deionized water and therefrom, 7 mL was sampled and added to the salt solution. The thus-prepared salt solution was used as the aqueous layer.

The oil layer and the aqueous layer were mixed and stirred at a high speed of 1,800 rpm for 5 minutes in Excel Auto Homogenizer (produced by Nihon Seiki Seisakusho K. K.) to adjust the oil droplets to from 20 to 100 $\mu$m. Thereafter, the dispersion was poured into 1 L-volume separable flask and reacted for 6 hours by elevating the temperature to 70° C. while stirring at 100 rpm in a water bath in a nitrogen gas atmosphere. After cooling, the copolymer particles produced were separated by filtration through a filter paper of No. 101, washed with 2 L of deionized water and further with 2 L of acetone, then air-dried by spreading the particles on a stainless steel-made vat, and further dried under reduced pressure at 60° C. for 16 hours. The copolymer particles obtained were classified into a particle size of 40 to 70 $\mu$m using a pneumatic classifier (MINI. CLASSIFIER, manufactured by NIPPON PNEUMATIC MFG) to prepare a packing material for use in introducing an ion exchange group.

Introduction of Epoxy Group

Into a 200 mL-volume separable flask with a stirring unit, 10.00 g of the packing material particles for use in introducing an ion exchange group, classified into a particle size of 40 to 70 $\mu$m were charged, and after adding 20 mL of epichlorohydrin (produced by Tokyo Kasei Kogyo K. K.) and stirring the mixture, 60 mL of a sodium hydroxide (produced by Wako Pure Chemical Industries, Ltd.) solution adjusted to 2N was added and reacted for 3 hours while stirring by elevating the temperature to 50° C. After cooling, the particles having introduced thereinto an epoxy group were separated by filtration through a filter paper of NO. 101, washed with 500 mL of deionized water and further with 500 mL of acetone, and then air-dried by spreading the particles on a stainless steel-made vat.

Introduction of Quaternary Ammonium Group

Into a 100 mL-volume separable flask with a stirring unit, 5.00 g of particles having introduced thereinto an epoxy group were charged. Thereto, 30 mL of dioxane (produced by Wako Pure Chemical Industries, Ltd.) was added and after stirring the mixture, 10 mL of triethylamine (produced by Kokusan Kagaku K. K.) was added and reacted for 8 hours while stirring by elevating the temperature to 80° C. After cooling, the particles having introduced thereinto a quaternary ammonium group were separated by filtration through a filter paper of NO. 101, washed with 500 mL of acetone and further with 500 mL of deionized water, and then air-dried by spreading the particles on a stainless steel-made vat.

The ion exchange capacity of this particle was measured and found to be 10.9$\mu$ equivalent per 1 dry gram.

Introduction of Sulfo Group

Into a 100 mL-volume separable flask with a stirring unit, 5.00 g of the packing material particles having introduced thereinto an epoxy group were charged. Thereto, 25 ml of deionized water was added and after stirring the mixture, 6.5 g of anhydrous sodium sulfite (produced by Kokusan Kagaku K. K.) was added and reacted for 6 hours while stirring by elevating the temperature to 70° C. After cooling, the particles having introduced thereinto a sulfo group were separated by filtration through a filter paper of NO. 101, washed with 500 mL of deionized water and further with 500 mL of acetone, and then air-dried by spreading the particles on a stainless steel-made vat.

The ion exchange capacity of the particle was measured and found to be 43.7$\mu$ equivalent per 1 dry gram.

The surface area of this copolymer particle was 635 m$^2$/g.

Measurement of Recovery by Solid Phase Extraction 250 mg of the packing material particles for solid phase extraction, which were classified into a particle size of 40 to 70 $\mu$m and in which a sulfo group was introduced, were packed in a 3 mL-volume reservoir to prepare a cartridge for solid phase extraction and the recovery thereof was measured through the following procedure.

(1) The cartridge for solid phase extraction was set to a suction manifold.

(2) 5 mL of methanol was passed at 5 mL/min.

(3) 5 mL of deionized water was passed at 5 mL/min.

(4) 100 mL of a sample adjusted to 0.25 ppm as a sample for concentration was passed at 5 mL/min and the sample was concentrated (adsorbed) in the cartridge for solid phase extraction.

(5) 5 mL of 0.1 N hydrochloric acid was passed at 5 mL/min.

(6) 5 mL of methanol was passed at 5 mL/min and the eluate was recovered.

(7) From the recovered eluate, 20 $\mu$L was sampled and analyzed by high performance liquid chromatograph to determine the area value.

(8) The same substance as the sample for concentration was used as the standard sample and 20 $\mu$L of the sample adjusted to 5 ppm was analyzed by high performance liquid chromatograph to determine the area value.

(9) The recovery was determined by the formula: area value of sample for concentration/area value of standard sample.

If the copolymer has a low capability of concentration, the sample is not adsorbed to the copolymer and the recovery decreases. The results of the measurement of recovery are shown in Table 1. The recovery was 85% or more and the copolymer was verified to be a packing material for solid phase extraction having an excellent capability of concentrating a sample.

Comparative Example 1

Polymerization and washing were performed in the same manner as in Example, and solid extraction was performed using the packing material classified into a particle size of 40 to 70 μm and having no ion exchange capability in the same manner. The results are shown in Table 1. This packing material for solid phase extraction having no ion exchange capability was revealed to be a packing material having a low recovery of a basic substance and inferior in the capability of concentrating a sample.

TABLE 1

| | Recovery (%) | |
|---|---|---|
| | Example 1 | Comparative Example 1 |
| Caffeine | 96.7 | 98.7 |
| Propranolol | 92.8 | 81.4 |
| Procaineamide | 91.0 | 73.6 |

Conditions for Measurement by High Performance Liquid Chromatography

Column: Shodex® C18-5A (4.6 mmφ×150 mm)
Moving phase: acetonitrile/100 mM phosphoric acid buffer solution=20/80 (V/V)
Flow rate: 1.0 mL/min
Detector: ultraviolet absorption detector
Measuring wavelength: UV 254 nm
Amount of sample injected: 20 μL The packing material for solid phase extraction of the present invention is a packing material ensuring excellent recovery of a hydrophobic substance and an ionic substance by introducing an ion exchange site without impairing the hydrophobic site of the packing material, thereby having both properties, which had not been taken into account in conventional packing materials. In particular, the packing material for solid phase extraction can easily concentrate a trace objective substance contained in an extra dilute solution in an environment-related sample or a medical sample and, at the same time, can easily remove impurities or contaminants present together. Accordingly, the packing material can facilitate various analyses with good precision, and therefore, is effective in the field over a wide range, for example, the measurement of harmful substances such as agrochemical in river water, the measurement of residual agrochemicals in farm products, and the measurement of a drug in serum.

While the invention has been described in detail and with reference to specific embodiments thereof, it will be apparent to one skilled in the art that various changes and modifications can be made therein without departing from the spirit and scope thereof.

What is claimed is:

1. A packing material for solid phase extraction, comprising a synthetic polymer obtained by copolymerizing a hydrophobic monomer (A) which comprises an aromatic divinyl compound and a hydrophilic monomer (B) which comprises a (meth)acrylic acid ester of a polyhydric alcohol having a hydroxyl group, wherein the (meth)acrylic acid ester of a polyhydric alcohol having a hydroxyl group is glycerol dimethacrylate, and introducing thereto an ion exchange group by a chemical modification comprising the step of introducing said ion exchange group by chemically bonding it to a hydroxyl group introduced from said glycerol dimethacrylate as the hydrophilic monomer (B), wherein said ion exchange group is covalently bonded to said polymer.

2. The packing material for solid phase extraction as claimed in claim 1, which contains an aromatic divinyl compound as the hydrophobic monomer (A) in an amount of 30% by mass or more based on a total amount of monomers.

3. The packing material for solid phase extraction as claimed in claim 1, which further contains an N-vinylcarboxylic acid amide as the hydrophilic monomer (B) in an amount of 5 to 60% by mass based on the total amount of monomers.

4. The packing material for solid phase extraction as claimed in claim 3, wherein the N-vinylcarboxylic acid amide is N-vinyl-2-pyrrolidone or N-vinylacetamide.

5. The packing material for solid phase extraction as claimed in claim 1, which contains a (meth)acrylic acid ester of a polyhydric alcohol having a hydroxyl group as the hydrophilic monomer (B) in an amount of 10% by mass or more based on a total amount of monomers.

6. The packing material for solid phase extraction as claimed in claim 1, wherein the ion exchange group covalently bonded is a sulfo group or a quaternary ammonium.

7. The packing material for solid phase extraction as claimed in claim 1, wherein an amount of an ion-exchange group covalently bonded is 5 μ-equivalent or more based on 1 dry gram of the packing material.

8. The packing material for solid phase extraction as claimed in claim 1, which packs a packing apparatus.

9. The packing material for solid phase extraction as claimed in claim 8, wherein the packing apparatus is a column, a cartridge or a reservoir.

10. The packing material for solid phase extraction as claimed in claim 1, which is used for concentrating an objective component and/or removing impurities or contaminants.

11. A method comprising carrying out a solid phase extraction employing a column switching method and the packing material for solid phase extraction described in claim 1.

12. A column for solid phase extraction, comprising a column packed with the packing material for solid phase extraction described in claim 1.

13. A cartridge for solid phase extraction, comprising a cartridge packed with the packing material for solid phase extraction described in claim 1.

14. The column for solid phase extraction as claimed in claim 12, which concentrates, identifies or quantifies an objective component and/or removes impurities or contaminants.

15. The cartridge for solid phase extraction as claimed in claim 13, which concentrates, identifies or quantifies an objective component and/or removes impurities or contaminants.

16. A solid phase extraction method for an environment-related, medical or biological sample, comprising concentrating, identifying or quantifying an objective component and/or removing impurities with the column for solid phase extraction described in claim 12.

17. A solid phase extraction method for an environment-related, medical or biological sample, comprising concentrating, identifying or quantifying an objective component and/or removing impurities with the column for solid phase extraction described in claim 13.

18. The method as claimed in claim 16, wherein a drug sample in serum is identified or quantified.

19. The method as claimed in claim 17, wherein a drug sample in serum is identified or quantified.

* * * * *